United States Patent [19]

Stodt

[11] 4,257,505

[45] Mar. 24, 1981

[54] POWER TAKE-OFF GEARING FOR OPERATING SEPARATE DRIVES, FOR USE FOR THE PROPELLERS OF AN AMPHIBIOUS VEHICLE, OR THE LIKE

[75] Inventor: Enno Stodt, Heidenheim, Fed. Rep. of Germany

[73] Assignee: Voith Getriebe KG, Fed. Rep. of Germany

[21] Appl. No.: 928,291

[22] Filed: Jul. 26, 1978

[30] Foreign Application Priority Data

Sep. 15, 1977 [DE] Fed. Rep. of Germany ....... 2741476

[51] Int. Cl.² .............................................. B60F 3/00
[52] U.S. Cl. .............................. 192/18 A; 192/87.13; 74/15.63; 114/270
[58] Field of Search ................. 192/4 A, 18 A, 87.13, 192/87.1; 74/15.63; 416/196 R, 170 R; 115/1 R

[56] References Cited

U.S. PATENT DOCUMENTS

| 3,176,585 | 4/1965 | Ruf ........................................ 115/1 R |
| 3,437,187 | 4/1969 | Umeda et al. ...................... 192/87.13 |
| 3,460,656 | 8/1969 | Swanson ............................ 192/87.13 |
| 3,486,477 | 12/1969 | Pender ................................. 115/1 R |
| 3,834,498 | 9/1974 | Ashfield .............................. 192/4 A |
| 3,872,954 | 3/1975 | Nordstrom et al. ................ 192/18 A |

*Primary Examiner*—Henry Jaudon
*Attorney, Agent, or Firm*—Ostrolenk, Faber, Gerb & Soffen

[57] ABSTRACT

Power take-off gearing for separate drives, for the propellers of an amphibious vehicle, or the like: A main drive shaft drives two separate driven shafts through respective slip clutches. Each clutch comprises a set of interleaved disks. A respective plunger selectively presses or does not press each set of disks together to drive each driven shaft at a speed dependent upon the plunger pressure. Hydraulic means which are solenoid valve controlled selectively activate and deactivate the clutch plungers, each clutch has its own control valve. A brake for both driven shafts is also activated by the solenoid valve.

21 Claims, 3 Drawing Figures

POWER TAKE-OFF GEARING FOR OPERATING SEPARATE DRIVES, FOR USE FOR THE PROPELLERS OF AN AMPHIBIOUS VEHICLE, OR THE LIKE

The present invention relates to a power take-off gearing for operating separate drives, particularly for use with the propellers of an amphibious vehicle in which the propellers are driven by a common drive through a transmission.

BACKGROUND OF THE INVENTION

An engine may be used to operate two or more separate drives. This presents difficulty when the drives are to be operated at variable rates with respect to each other.

One example of this situation is amphibious vehicles. Amphibious vehicles normally have one propeller at the front and one propeller at the rear. When such a vehicle travels on land, the propellers are halted and the engine of the vehicle drives the vehicle in the traditional manner via the wheels. In water, the propellers are connected via the transmission to the engine that drives the wheels.

Due to the fixed transmission ratios between the two propellers, the propellers rotate at a predetermined, fixed speed ratio. This impairs the maneuverability of the amphibious vehicle.

SUMMARY OF THE INVENTION

The primary object of the present invention is to operate a plurality of separate drives at variable rates with respect to each other from a single engine.

Another object is to provide an amphibious vehicle which has good maneuverability while using only simple parts.

It is another object of the invention to drive two propellers from a single drive at different respective rates which can be readily adjusted with respect to each other.

The invention will hereafter be described with reference to an amphibious vehicle, but is not to be thus limited.

In accordance with the invention, each propeller of an amphibious vehicle is driven from a main drive shaft to individual driven shafts for each propeller through a respective multiple interleaved disk clutch for each driven shaft. Each clutch is designed to permit continuous slippage between the column drive for both propellers and each propeller itself. Such a clutch is called an Inch clutch or a modulation clutch. The propeller rotation speeds are adjustable, independently of each other, via the respective multiple-disk clutches.

As a result of the invention, excellent maneuverability of the amphibious vehicle is obtained. As flow conditions vary in the body of water (lake, river, ocean) through which the craft is moving, the propellers can be rotated at different respective speeds. Normally, the propeller which is then at the front is rotated more slowly. Good maneuverability is obtainable even when the craft is traveling in flowing waters.

Normally, the speed of rotation of the propellers is selected to be as fast as is necessary for the rear propeller. The speed of rotation of the front propeller can then be reduced by the Inch clutch.

The use of an Inch clutch for regulating rotation speeds is already known, for instance, in the case of lift trucks. A hydrodynamic converter, which is a fluid-flow machine, an example of which is a wind turbine, can in this connection also be provided with an Inch clutch. The power consumption of the converter is controlled in this case by allowing the Inch clutch connected in front of it to slip. By coordination of the linear frictional characteristic of the Inch clutch with the parabolic curve of drive torque of the converter pump, at most 15% of the maximum power in the Inch clutch can be converted into heat. Suitable design of the multiple-disk clutch enables this heat development to now be controlled.

It has now been found that ships' propellers also have a parabolically-shaped curve depicting their consumption of drive torque. This principle can be employed also with an amphibious vehicle.

In one embodiment of the invention, each clutch is hydraulically controlled, with varying hydraulic pressure moving the clutches to engage more or less securely. A respective slide control valve for each clutch regulates the hydraulic pressure to the clutch. Regulation of the pressure to a clutch either engages the clutch disks or more securely, which moves the propellers to rotate more rapidly, or permits the clutch disks to separate to a predetermined extent, which slows the propellers with respect to the drive shaft.

In order to supply both multiple-disk clutches with oil under pressure to deliver hydraulic pressure, a common solenoid valve is movable either to connect the oil pressure to the clutches or to connect it to braking means which securely halt propeller rotation. When the solenoid valve is operated to release pressurized oil to the clutches, the propellers are jointly placed in operation, and their respective speeds of rotation are adjusted independently of each other by means of the individual control slide valves.

In a further development of the invention, the control valves for each clutch are adapted to be actuated by hand via levers, control sticks, or the like. In this way the speeds of rotation of the propellers can in each case be adjusted continuously.

It is advantageous for the power take-off gearing to be further provided with a braking device. This assures that the propellers will be stationary when the vehicle is traveling on land. In one simple embodiment, there is a braking device that is comprised of at least one piston which can be pressed against a gear of the power take-off gearing. The piston would also be operated through an oil pressure conduit. The above noted solenoid valve would have an alternate condition at which pressure to the clutches would be cut off and pressure would instead be directed to the braking device.

Other objects and features of the invention can be understood from the following description of the accompanying drawings.

DESCRIPTION OF A PREFERRED EMBODIMENT

Figure 1:
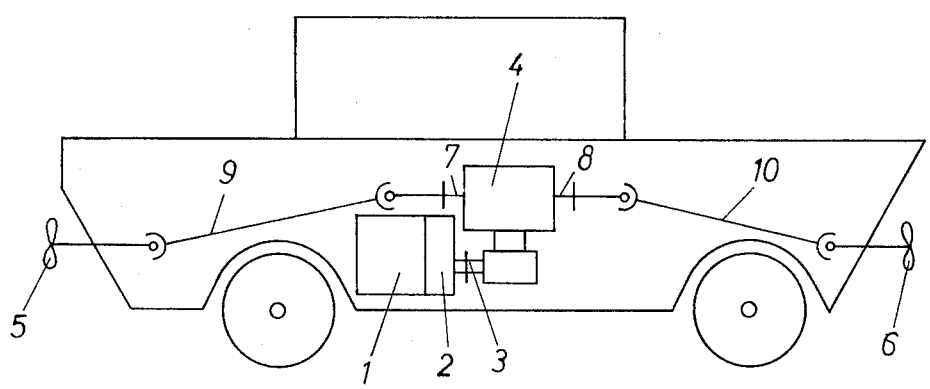
FIG. 1 is a schematic view of an amphibious vehicle equipped with the power take-off gearing of the present invention.

The amphibious vehicle shown in FIG. 1 has a conventional internal combustion engine 1 for the driving of its wheels. From the main conventional transmission 2 of the engine, a shaft 3 branches off to the power take-off gearing 4 for the two propellers 5 and 6 which are located at opposite ends of the vehicle. The two output shafts 7 and 8 of the power take-off gearing 4 are connected with the respective propellers 5 and 6 by shafts 9 and 10 joined thereto through universal couplings. When the vehicle travels in water, the propellers are operated to drive the vehicle.

Figure 2:
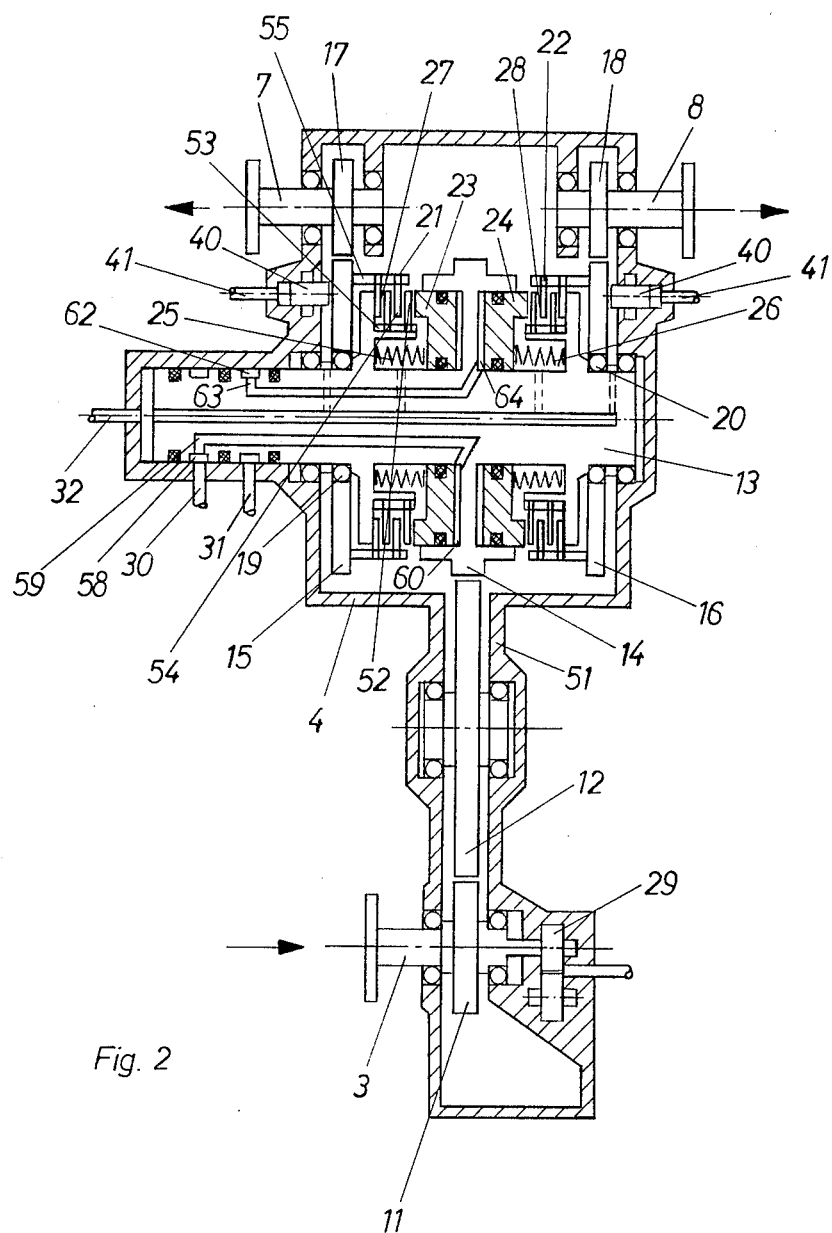
FIG. 2 shows the power take-off gearing according to the invention, including the Inch clutches.

The power take-off gearing is shown in detail in FIG. 2. The shaft 3 has a gear 11 mounted on it to rotate with it. Via an intermediate gear 12, shaft 3 and gear 11 drive a gear 14, which is affixed on a rotatable clutch shaft 13. Two gears 15 and 16 are spaced apart along and are arranged around the clutch shaft 13. The two gears 15 and 16 are supported over the clutch shaft via respective bearings 19 and 20. The bearings permit the gears to rotate more slowly than or to stop with respect to rotation of the shaft 13.

By means of the pinions 17 and 18, which are carried on the respective output shafts 7 and 8 of the power take-off gearing 4, the gears 15 and 16 drive the output shafts 7 and 8.

The various shafts and gears are supported in a housing 51 by bearings which enable them to rotate in place.

Two Inch clutches 21 and 22 are placed on the clutch shaft 13, one for each gear 15 and 16, respectively. Each clutch is comprised of a respective axially displaceable piston, piston 23 being for clutch 21 and piston 24 being for clutch 22. The piston is sealingly carried on and rotates with the gear 14 and shaft 13. A respective spring 25 and 26 operates between a respective abutment on the shaft 13 and the respective rotating piston to urge the pistons toward each other. This frees the below described clutch disks from engagement to slow or eventually halt the gears 15 and 16 and thereby the propeller drives 7 and 8 and the propellers 5 and 6.

The clutches 21, 22 also include the sets of disks 27 and 28, respectively. Each set of disks 27 or 28 is comprised of an interleaved first group of disks 52 that are attached on the shaft 13 by an annular flange 53 from which the shaft disks 52 project radially outwardly, and a second group of disks 54 attached to the respective gears 15, 16 by a second annular flange 55, of greater diameter than the flange 53 and extending over the flange 53 and from which the disks 54 attached to the gear project radially inwardly. The disks 54 attached to the gears 15, 16 rotate with those gears. The disks 52, 54 are resiliently deflectable under the influence of the pistons 23, 24 being urged against them.

The shaft 3 also drives a gear pump 29 which supplies both Inch clutches 21 and 22 with hydraulic pressurizing oil and with lubricating oil. A pressurizing oil conduit 30 connected (by a connection not shown) to pump 29 leads to an annular groove 58 around shaft 13, which is sealed closed in the housing 51, and the groove 58 communicates through the passage 59 in shaft 13 with the cylinder 60 behind the piston 23. The pump 29 also communicates with the hydraulic pressurizing oil conduit 31 which leads to the corresponding groove 62 around shaft 13. The groove communicates through the passage 63 in the shaft 13 with the cylinder 64 behind the piston 24. In addition, a lubricating oil line 32 is also supplied with oil by the gear pump 29.

Depending on the pressure in each of the pressurizing oil conduits 30 and 31, the respective pistons 23 and 24 are pressed, in opposition to the force of the springs 25 and 26, against the respective disks 27 and 28. The normally separated groups of interleaved disks are resiliently deformed by the piston and neighboring disks are pressed together. The disks deform in a cascading sequence, with the disks nearer the pistons 23, 24 deforming before the others. As a result, as the piston pressures increase the more the pistons shift, the greater the number of disks that engage and the less slippage there is in the clutches. As the piston pressures increase, the gears 15 and 16 respectively are correspondingly speeded up with respect to the speed of the shaft 13 on which they are riding, whereby the gears are driven at speeds of rotation that increase corresponding to the oil pressure in respective conduits 30 and 31. The pressures in the conduits 30 and 31 can be appropriately adjusted with respect to each other. In this way, the speeds of rotation of the output shafts 7 and 8 can be regulated independently of each other.

Figure 3:
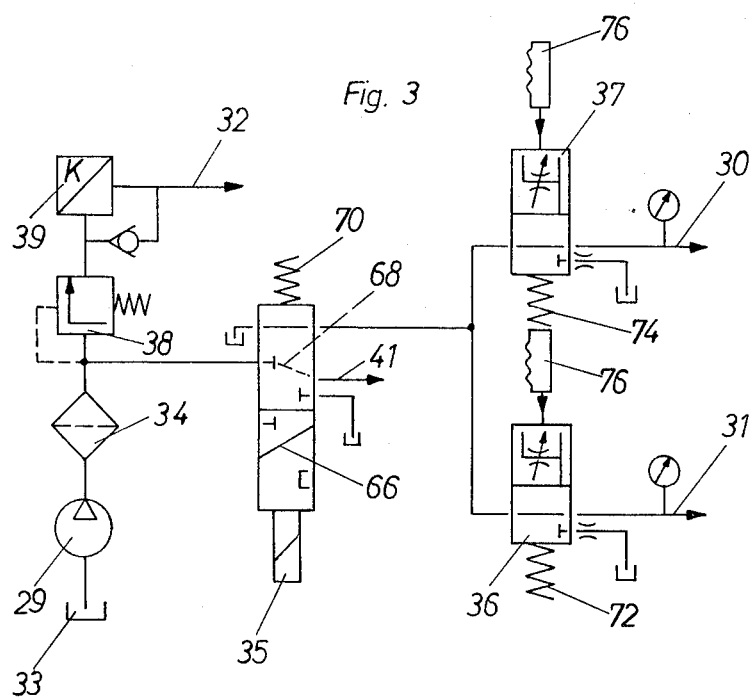
FIG. 3 is a schematic control diagram for the Inch clutches.

The hydraulic control for the power take-off gearing of FIG. 2 is shown in FIG. 3. The gear pump 29 pumps the oil from a tank 33 through a filter 34 to a solenoid valve 35. The solenoid valve has a first passage 66 connectable to the conduits 30, 31 and a second passage 68 connectable to the conduit 41. The solenoid is biased by spring 70 to connect below described braking conduit 41. Conventional electric means (not shown) urge the solenoid 35 to shift against spring 70 to connect passage 68 in circuit. If the propellers are to be driven, the solenoid 35 is operated to shift up in FIG. 3 to release the hydraulic fluid flow to the two control valves 36 and 37 through passage 66.

By means of the control valves 36 and 37, the individual adjustment of pressure for the respective Inch clutches 21 or 22 takes place. The two control valves 36 and 37 are normally biased upwardly in FIG. 3 to an open condition by the respective springs 72 and 74 and they are actuated by hand by the driver via a lever or control stick 76, which urges the control valves downwardly in FIG. 3 (as shown by the arrow) to a closed condition.

The power take-off gearing 4 is provided with lubricating oil through the conduit 32 via a pressure valve 38 and a cooler 39.

The power take-off gearing 4 is provided with a braking device in order to assure that the propellers 5 and 6 will be stationary when the amphibious vehicle is traveling on land. The braking device is comprised of two separate pistons 40, which can be pressed laterally against the gears 15 and 16, respectively, to restrain rotation of the gears with respect to the shaft 13 on which they sit. The pistons 40 are in this connection both actuated through the oil pressure conduit 41 which branches to communicate with both pistons. The two branch oil pressure conduit 41 is in this connection also controlled from the solenoid valve 35. As an alternative to engaging the gears 15, 16, the braking device pistons can also be arranged to act on the pinions 17 and 18.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Power take-off gearing for an amphibious vehicle, for operating two separate propellers of the vehicle, comprising:
   a common drive having a drive shaft;
   a first and a separate second driven shaft for being driven by said drive shaft; a respective first propeller connected to said first driven shaft for being rotated thereby and a respective second propeller connected to said second driven shaft for being driven thereby;
   a first slip clutch between said common drive and said first driven shaft; a second slip clutch between said common drive and said second driven shaft;
   first control means for selectively controlling the slippage of said first clutch; second control means for independently selectively controlling the slippage of said second clutch,
   whereby the rotation rates of said driven shafts are independently adjustable.

2. The power take-off gearing of claim 1, wherein each said clutch is a multiple disk clutch, including a first set of disks connected with said drive shaft for rotating therewith and a second set of disks connected with the respective said driven shaft for rotating therewith; said first and said second sets of discs being interleaved;
   the respective said control means selectively increasing or decreasing the extent of engagement between said sets of discs of a said clutch for respectively increasing or decreasing the rate of rotation with respect to said driven shaft with respect to said drive shaft.

3. The power take-off gearing of either of claims 1 or 2, further comprising a braking device connected with each said driven shaft for selectively braking rotation thereof.

4. The power take-off gearing of claim 2, wherein each said control means comprises a hydraulic pressure operated plunger shiftable toward a first position for pushing said discs of said interleaved sets thereof together and toward a second position allowing said disks of said interleaved sets thereof to move apart;
   supply means for supplying hydraulic pressure to said plungers for operating them.

5. The power take-off gearing of claim 4, further comprising a solenoid valve operable between a first position at which hydraulic pressure is supplied to both said control means and a second position at which hydraulic pressure is not supplied to both said control means.

6. The power take-off gearing of claim 4, wherein each said control means comprises a respective control valve for regulating the pressure on its said plunger.

7. The power take-off gearing of claim 6, further comprising a solenoid valve operable between a first position at which hydraulic pressure is supplied to both said control means by said supply means and a second position at which hydraulic pressure is not supplied to both said control means.

8. The power take-off gearing of claim 7, further comprising manually operable means associated with each said control valve for adjusting the hydraulic pressure through that said valve.

9. The power take-off gearing of claim 7, further comprising a braking device connected with each said driven shaft for selectively braking rotation thereof.

10. The power take-off gearing of claim 9, further comprising a first conduit for hydraulic fluid communicating with said solenoid valve such that in said first position of said solenoid valve, hydraulic pressure is supplied to said control means and not to said braking device, and a second conduit for hydraulic fluid communicating with said solenoid valve such that in said second position of said solenoid valve, hydraulic pressure is supplied to said braking device and not to said control means.

11. The power take-off gearing of claim 9, wherein each said braking device comprises a shiftable piston shiftable into engagement with the respective said driven shaft for tending to halt rotation thereof.

12. The power take-off gearing of claim 4, further comprising a braking device connected with each said driven shaft for selectively braking rotation thereof.

13. The power take-off gearing of claim 12, wherein each said braking device comprises a shiftable piston shiftable into engagement with the respective said driven shaft for tending to halt rotation thereof.

14. The power take-off gearing of claim 13, further comprising means for supplying hydraulic pressure to said braking device piston for causing it to shift.

15. The power take-off gearing of claim 4, wherein said plungers are both carried on said driven shaft and shift toward and away from the respective said clutches along said drive shaft; for each said plunger, there is a respective hydraulic fluid chamber behind that said plunger on said common drive shaft.

16. The power take-off gearing of claim 15, further comprising a gear on each said driven shaft and rotatable therewith and connected with said clutch to be rotated thereby; each said brake plunger being engageable with the said gear of said driven shaft.

17. The power take-off gearing of claim 15, further comprising a common solenoid valve operable between a first position at which hydraulic pressure is supplied to said hydraulic fluid chambers and a second position at which hydraulic pressure is not supplied to those said chambers.

18. The power take-off gearing of claim 17, further comprising a braking device connected with each said driven shaft for selectively braking rotation thereof; each said braking device comprising a shiftable piston which is shiftable into engagement with the respective said driven shaft for tending to halt rotation thereof;
   said means for supplying hydraulic pressure to said braking device piston further comprises a conduit for hydraulic fluid communicating with said solenoid valve such that in said first position of said solenoid valve, hydraulic pressure is supplied to said plunger chambers and not to said braking device piston, and in said second position of said solenoid valve, hydraulic pressure is supplied to said braking device piston and not to said plunger chambers.

19. An amphibious vehicle, comprising:
   said power take-off gearing of any claims 1, 2, 4 or 12; and
   a vehicle body; said power take-off gearing being supported by said vehicle body; both said propellers being located outside said vehicle body and being supported there by said vehicle body.

20. The amphibious vehicle of claim 19, wherein said vehicle body has a front and a rear; one said propeller being located and supported outside said front and the other said propeller being located and supported outside said rear of said vehicle body.

21. The amphibious vehicle of claim 20, wherein said body also supports rotatable vehicle wheels on which the vehicle may travel.

* * * * *